(12) United States Patent
Chase et al.

(10) Patent No.: US 7,552,235 B2
(45) Date of Patent: Jun. 23, 2009

(54) AUTONOMIC SELECTION OF A REQUEST ROUTING POLICY BASED UPON CACHE EFFECTIVENESS

(75) Inventors: Jeffery S. Chase, Durham, NC (US); Ronald P. Doyle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1005 days.

(21) Appl. No.: 10/733,996

(22) Filed: Dec. 11, 2003

(65) Prior Publication Data
US 2005/0144317 A1 Jun. 30, 2005

(51) Int. Cl.
*G06F 15/16* (2006.01)

(52) U.S. Cl. .................... 709/238; 709/203; 709/228; 709/223; 709/226; 709/232; 709/224; 709/242; 715/705; 370/432; 370/349; 370/401; 370/389; 455/432.1; 455/435.1; 710/316

(58) Field of Classification Search ............... 709/203, 709/228, 246, 223, 226, 201, 232, 245, 249, 709/241, 225, 219, 323, 229, 224, 242, 202, 709/218; 370/395.2, 390, 432, 349, 401, 370/389, 351; 726/28; 719/317; 710/316; 455/432.1, 435.1; 715/705; 718/105, 104

See application file for complete search history.

(56) References Cited

U.S. PATENT DOCUMENTS

| | | | |
|---|---|---|---|
| 6,535,509 B2 * | 3/2003 | Amicangioli | ............... 370/389 |
| 6,557,079 B1 | 4/2003 | Mason, Jr. et al. | |
| 6,944,715 B2 * | 9/2005 | Britton et al. | ............... 711/129 |
| 7,146,429 B2 * | 12/2006 | Michel | ............... 709/238 |
| 2002/0199014 A1 * | 12/2002 | Yang et al. | ............... 709/238 |
| 2003/0005116 A1 | 1/2003 | Chase | |
| 2004/0162901 A1 * | 8/2004 | Mangipudi et al. | ........... 709/225 |
| 2008/0010381 A1 * | 1/2008 | Barraclough et al. | ........ 709/228 |

OTHER PUBLICATIONS

Doyle, Ronald et al., *The Trickle-Down Effect: Web Caching and Server Request Distribution*, <http://www.cs.duke.edu/ari/publications/trickle.ps> (visited Sep. 23, 2003).
Breslau, Lee, *Web Caching and Zipf-like Distributions: Evidence and Implications*, IEEE Infocom, vol. XX, No. Y Month 1999.

* cited by examiner

*Primary Examiner*—Ario Etienne
*Assistant Examiner*—Barbara N Burgess
(74) *Attorney, Agent, or Firm*—A. Bruce Clay, Esq.; Steven M. Greenberg, Esq.; Carey Rodriguez Greenberg & Paul LLP

(57) ABSTRACT

The present invention is a system, method and apparatus for autonomic request routing policy selection. The system of the invention can include a multiplicity of pre-configured request routing policies and a data store of cache metrics for the pre-configured request routing policies. A routing policy selector can be configured for communicative linkage to a server cluster having one or more servers and programmed to select a particular one of the request routing policies for use in routing content requests in the server cluster based upon the cache metrics. In this regard, the routing policy selector further can include a coupling to the routing policies and the data store of cache metrics.

8 Claims, 2 Drawing Sheets

AUTONOMIC SELECTION OF A REQUEST ROUTING POLICY BASED UPON CACHE EFFECTIVENESS

BACKGROUND OF THE INVENTION

1. Statement of the Technical Field

The present invention relates to the request routing in a content delivery network and more particularly to the autonomic selection of a routing policy based upon the predicted cache effectiveness of the selected routing policy.

2. Description of the Related Art

In the prototypical content delivery system, content can be delivered from an origin server to a community of content consuming clients. Content typically can be delivered according to a request-response paradigm in which the content consuming clients initiate a request for content to which one or more origin servers can respond with the requested content. Generally, one or more content caches can be disposed in the intermediate communications path between the content consuming clients and content servers in order to enhance the responsiveness of the servers to any single client request and to reduce the processing burden placed upon the origin server.

A variety of mechanisms route content request streams through intermediate caches. For instance, content clients may be configured to use a particular cache. Similarly, the content delivery system itself may redirect requests by interposing on DNS translations or by intercepting requests at the IP level. In addition, each cache may control the routing of its own miss stream to other components. The last two years have seen an explosion of growth in content caching and content delivery infrastructure. Key developments include the increased role of surrogate caching among hosting providers and the aggregation of content consumers into large Internet service providers employing transparent interception proxies based upon Layer 7 switches. These developments have fed the growth in demand for Web caching systems.

Today, server farms host many content sites, where a group of servers can be clustered together to act as a unified server to external clients. Any given request could be handled by any of several servers, thereby improving scalability and fault-tolerance. The switching infrastructure connecting the servers to the hosting network generally includes one or more redirecting server switches to route incoming request traced to the servers. Referred to in the art as request distributors, these switches select individual servers to handle each incoming content request. Thus, the server selection policy can play an important role in managing cluster resources in order to maximize throughput and meet quality-of-service goals.

Conventional server switches often incorporate a variety of request routing methodologies when distributing requests to backend server processes. In particular, the server selection methodologies can be selected in order to maximize throughput and minimize response latency. For instance, server load balancing oriented methodologies monitor server status and direct requests to lightly loaded servers. Notably, server load balancing switches often are referred to as Layer 4 switches because server load balancing switches make server selection decisions at connection setup time, and examine only the Layer 4 transport headers of the incoming packet stream.

Content-aware server selection policies, by comparison, prefer servers that can handle a given request most efficiently. Importantly, the most efficient requesting handling servers incorporate caching technology and, accordingly, the server most likely to be able to process a request most effectively is the server likely to have the requested data in cache. Uniform Resource Locator (URL) hashing is a content-based policy that applies a simple deterministic hash function upon the request URL to select a server. URL hashing has often been referred to as a Layer 7 policy because the URL hashing switch typically parses protocol headers at Layer 7 in order to extract the respective URL.

Observations of content request patterns drive the design choices and policies for all of these components of a content delivery architecture. In particular, a number of studies indicate that requests to retrieve static Web objects follow a Zipf-like popularity distribution. Specifically, in accordance with Zipf, the probability $p_i$ of a request for the $i^{th}$ most popular document is proportional to $1/i^\alpha$ for some parameter $\alpha$. In this Zipf-like distribution, a large number of object requests typically target the most popular object sources and the most popular objects within those sources. The Zipf-like distribution, however, also includes a long, heavy tail of less popular objects with poor reference locality. Notably, higher $\alpha$ values increase the concentration of requests on the most popular objects. One implication of the Zipf-like behavior of the Web is that caching is highly effective for the most popular static, and thus cacheable objects, assuming that popularity dominates rate of change. Unfortunately, caching is less effective in respect to the heavy tail of the distribution, which comprises a significant fraction of requests. Hence, Web cache effectiveness typically improves only logarithmically with the size of the cache, measured either by capacity or by user population.

Zipf-like behavior also has implications for selecting a request routing policy in a server cluster. For example, the Zipf-like behavior of the Web creates a tension between the competing goals of load balancing and locality. On the one hand, content-aware policies such as Layer 7 URL hashing effectively take advantage of the locality present in the request stream by preferring the same server for repeat requests, maximizing server memory hits for popular objects. However, Layer 7 URL hashing remains vulnerable to load imbalances because the most popular objects receive the largest number of requests, and a single server handles all requests for any given object. Layer 4 type server load balancing policies balance load, but Layer 4 type server load balancing policies tend to scatter requests for each object across the servers, reducing server memory hits in the cache for moderately popular objects.

Recent research has studied this tradeoff in depth, and has resulted in the development of the Locality Aware Request Distribution policy and related policies to balance these competing goals, combining the benefits of each approach. Other commercial request distributors use less sophisticated strategies such as assigning multiple servers to each URL hash bucket, and selecting from the target set using load information. In either case, however, the skilled artisan will recognize the importance of selecting a suitable routing policy at design time. Accordingly, the conventional selection of a particular routing policy often can depend upon the goals of the systems architect when the system is configured. Predicting the actual requirements of the system at design time, however, can be difficult for most. Moreover, whereas optimally selecting a suitable request routing policy can be problematic generally, in an autonomic system, the problem can be particularly acute.

For the uninitiated, autonomic computing systems self-regulate, self-repair and respond to changing conditions, without requiring any conscious effort on the part of the computing system operator. To that end, the computing system itself can bear the responsibility of coping with its own complexity. The crux of autonomic computing relates to eight principal characteristics:

I. The system must "know itself" and include those system components which also possess a system identify.
II. The system must be able to configure and reconfigure itself under varying and unpredictable conditions.
III. The system must never settle for the status quo and the system must always look for ways to optimize its workings.
IV. The system must be self-healing and capable of recovering from routine and extraordinary events that might cause some of its parts to malfunction.
V. The system must be an expert in self-protection.
VI. The system must know its environment and the context surrounding its activity, and act accordingly.
VII. The system must adhere to open standards.
VIII. The system must anticipate the optimized resources needed while keeping its complexity hidden from the user.

Thus, in keeping with the principles of autonomic computing, request routing methodologies ought to change as the impact of selecting any one methodology over the other becomes more advantageous for the operation of the system.

SUMMARY OF THE INVENTION

The present invention addresses the deficiencies of the art in respect to request routing in an information system and provides a novel and non-obvious method, system and apparatus for selecting a request routing policy based upon the cache effectiveness of the selected policy. In a preferred aspect of the invention, an autonomic request routing policy selection system can include a multiplicity of pre-configured request routing policies and a data store of cache metrics for the pre-configured request routing policies. A routing policy selector can be configured for communicative linkage to a server cluster having one or more servers and programmed to select a particular one of the request routing policies for use in routing content requests in the server cluster based upon the cache metrics. In this regard, the routing policy selector further can include a coupling to the routing policies and the data store of cache metrics.

In a preferred aspect of the invention, the pre-configured request routing policies can include a Layer 4 request routing policy and a Layer 7 request routing policy. The Layer 4 request routing policy can be a server load balancing type policy. By comparison, the Layer 7 request routing policy can be a content localizing type policy. Moreover, the content localizing type policy can be a URL hashing policy. Finally, the cache metrics can include a plurality of Zipf-like analyses based upon different selected alpha values for different workloads imposed upon the server cluster according to different ones of the request routing policies.

An autonomic request routing policy selection method can include the steps of identifying a contemporary trace footprint experienced by a coupled server cluster, identifying a cache allocation for the coupled server cluster and retrieving at least two sets of hit rate metrics, where each set of metrics corresponds to a particular routing policy. The hit rate metrics can be compared based upon the identified trace footprint and the identified cache allocation to determine a preferred routing policy. As a result, a preferred routing policy can be selected for use in routing content requests to the server cluster. Moreover, an optimal server cluster configuration can be computed with the hit rate metrics for the preferred routing policy and an optimal number of servers can be provisioned in the server cluster based upon the computed optimal server cluster configuration.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for autonomically selecting a request routing methodology based upon the cache effectiveness of the selected methodology. In accordance with the present invention, the hit rates for a variable number of servers in a server cluster can be computed for a varying volume of network requests referred to as the trace footprint based upon a selected cache size for the cluster. Notably, the hit rates can be computed for two or more request routing selection policies.

Subsequently, as the trace footprint experienced within a server cluster changes, the trace footprint and available cache size can be used to select a suitable routing policy. Moreover, once a routing policy has been selected, a suitable number of servers can be provisioned within the server cluster to optimize the cache effectiveness of the system. For example, where the current setting of the size of the cache approaches a significant proportion of the trace footprint, a load balancing oriented request routing policy can be chosen. In contrast, where the trace footprint is large, or where the cache size is small, a content localizing request routing policy can be chosen.

Figure 1:
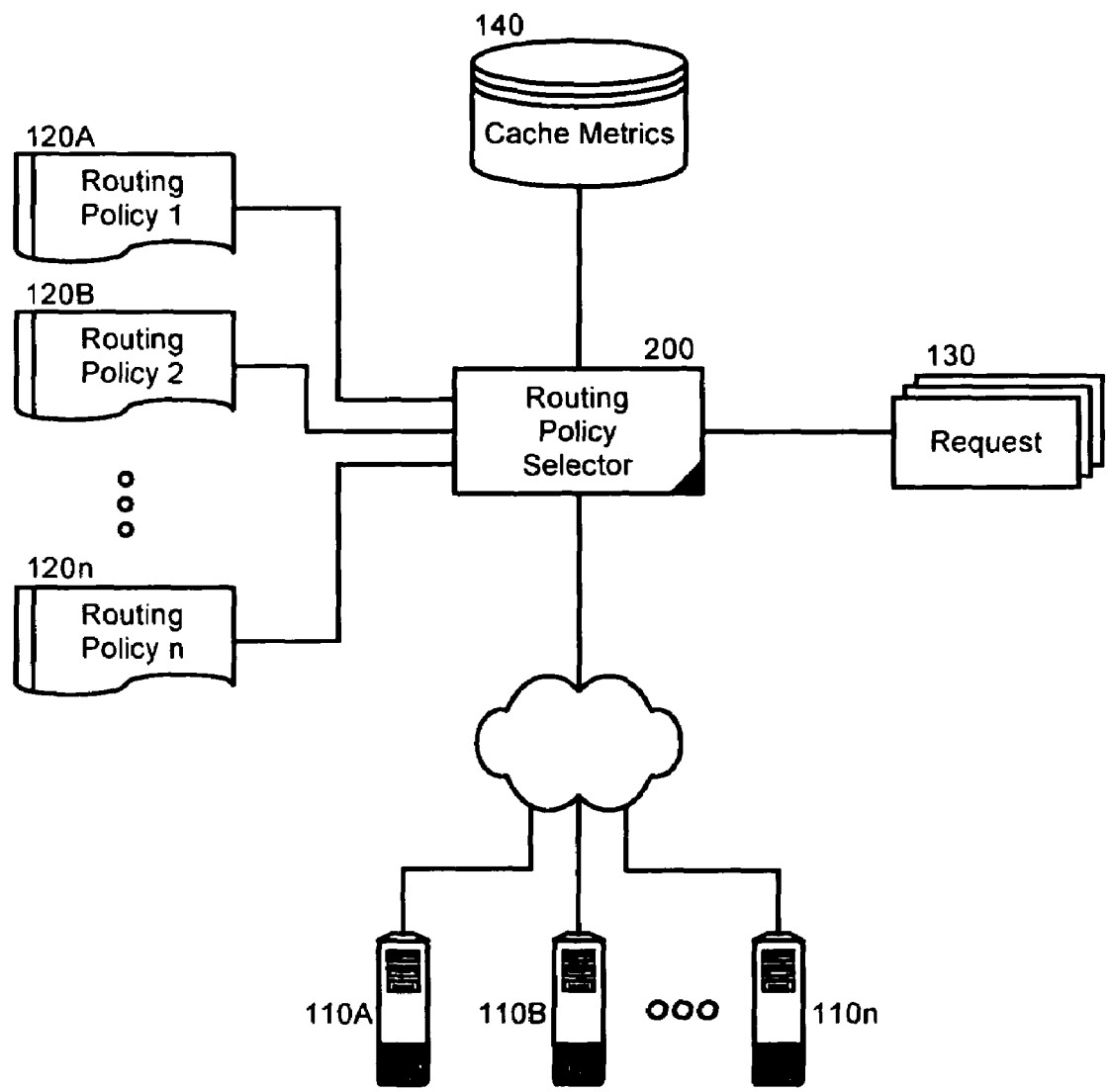
FIG. 1 is a schematic illustration of a content distribution server cluster-configured with an autonomic routing policy selector which has been configured in accordance with the present invention; and, FIG. 2 is a flow chart illustrating a process for selecting a routing policy based upon predicted cache effectiveness for the selected routing policy.

FIG. 1 is a schematic illustration of a content distribution server cluster 110A, 110B, 110n configured with an autonomic routing policy selector 200 which has been configured in accordance with the present invention. The server cluster 110A, 110B, 110n can include server processes and server devices programmed to process requests for content 130, to retrieve requested content from fixed storage and to serve the retrieved content to requesting client processes. Importantly, to vastly enhance the performance and responsiveness of the server cluster 110A, 100B, 110n, each server process and server device can include a cache in which frequently accessed content can be stored for quick retrieval. As it will be understood by the skilled artisan, the very responsiveness of the server cluster 110A, 110B, 110n can depend upon the effective use of the cache.

A routing policy selector 200 can be coupled to the server cluster 110A, 110B, 110n and can manage the methodology utilized to route particular content requests to selected ones of the server processes and server devices in the server cluster 110A, 110B, 110n. In this regard, the routing policy selector 200 can include a coupling to a set of routing policies 120A, 120B, 120n. These routing policies can include a range of policies which vary from pure server load balancing oriented policies, to content localizing policies, to an intermediate blend of both. Significantly, the routing policy selector 200 can be programmed to select a particular one of the routing policies 120A, 120B, 120n based upon both computed and observed cache metrics 140.

The cache metrics 140 can include observed hit rates for specific workloads for each of the routing policies 120A, 120B, 120n. The observed hit rates can reflect a particular cache size expressed as a proportion of available cache memory in the server cluster 110A, 110B, 110n. The hit rates further can vary based upon the number of server processes and devices provisioned for use in responding to the specific workloads in the server cluster 110A, 110B, 110n. Based upon the observed hit rates for the cache metrics 140, the routing policy selector 200 not only can select a suitable one of the routing policies 120A, 120B, 120n for a contemporary trace footprint, but also the routing policy selector 200 can provision a suitable number of server processes and server devices in the server cluster 110A, 110B, 110n to optimize the cache effectiveness of the server cluster 110A, 110B, 110n based upon the cache metrics 140.

Figure 2:
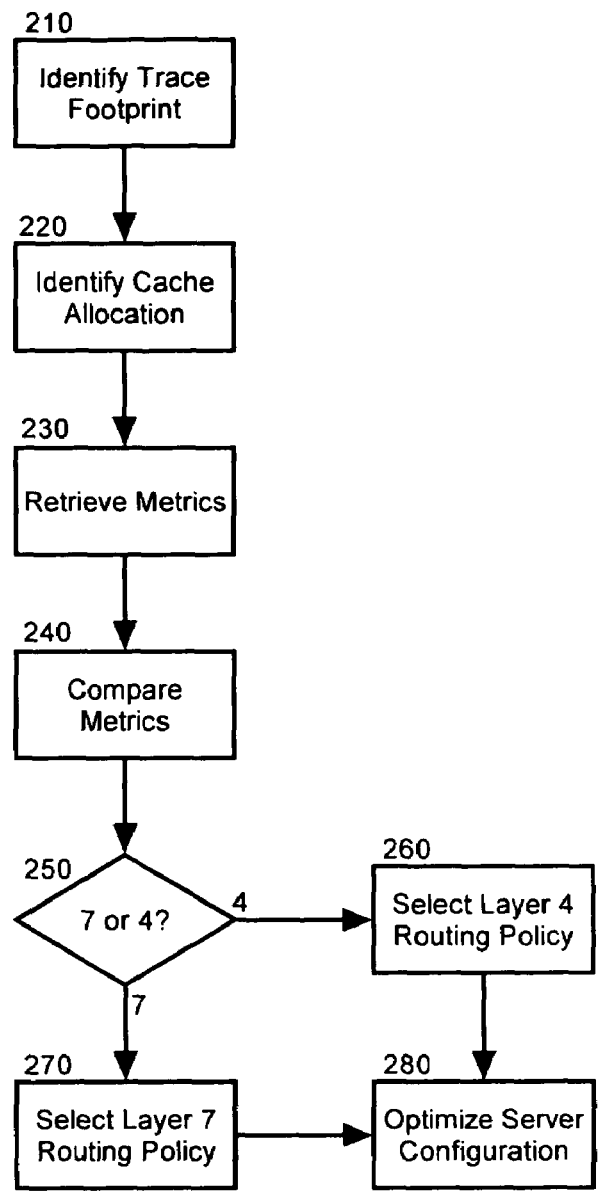

In more particular illustration, FIG. 2 is a flow chart depicting a process for selecting a routing policy based upon predicted cache effectiveness for the selected routing policy. Beginning in block 210, a contemporary trace footprint can be identified as contemporarily experienced in the server cluster. In block 220, a contemporarily configured cache allocation further can be identified. In block 230, previously computed metrics for the server cluster can be retrieved for analysis. The previously computed metrics can include a Zipf-like analysis of previously observed workloads imposed upon varying configurations of the server cluster, but in terms of a number of provisioned servers in the cluster, and also the proportional cache allocation for the cluster.

Notably, the Zipf-like analysis can be performed for several different alpha values as is well-known in the art and described in substantial depth in R. Doyle, J. Chase, S. Gadde and A. Vahdat, *The Trickle-Down Effect: Web Caching and Server Request Distribution*, Proceedings of the 6th International Workshop on Web Caching and Content Distribution (WCW '01) (June 2001). The Zipf-like analysis further can be performed for different ones of the request routing policies, including a Layer 4 server load balancing policy and a Layer 7 content localization policy. In block 240, the metrics for the analyses can be compared and in decision block 250 an optimal request routing policy can be selected.

For instance, where the trace footprint is very large, or where the available cache allocation is quite small, the metrics will indicate a preference for a Layer 7 type routing policy. By comparison, where the cache allocation approaches the same size as the trace footprint, a Layer 4 type routing policy can be preferred. In any case, either a Layer 4 type policy can be selected in block 260, or a layer 7 type policy can be selected in block 270. In either case, once a particular routing policy has been selected, the metrics once again can be consulted to identify an optimal number of servers to be deployed in the server cluster. Noting that the impact of each additional server can fall off logarithmically, it is preferred that a minimum number of servers to achieve optimal cache performance can be provisioned. Once determined, the optimal server configuration can be deployed in block 280.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. An autonomic request routing policy selection method comprising the steps of:
    identifying a contemporary trace footprint experienced by a coupled server cluster;
    identifying a cache allocation for said coupled server cluster;
    retrieving at least two sets of hit rate metrics, each set of metrics corresponding to a particular routing policy;
    comparing said hit rate metrics based upon said identified trace footprint and said identified cache allocation to determine a preferred routing policy; and,
    selecting said preferred routing policy for use in routing content requests to said server cluster.

2. The method of claim 1, further comprising the steps of:
    computing with said hit rate metrics, an optimal server cluster configuration for said preferred routing policy; and,
    provisioning an optimal number of servers in said server cluster based upon said computed optimal server cluster configuration.

3. The method of claim 1, wherein said selecting step comprises the step of selecting a server load balancing type routing policy when said identified cache allocation approaches in value said identified trace footprint.

4. The method of claim 1, wherein said selecting step comprises the step of selecting a content localizing type routing policy when either said identified cache allocation is small, or when said trace footprint is large.

5. A machine readable storage having stored thereon a computer program for autonomic request routing policy selection, the computer program comprising a routine set of instructions which when executed by the machine cause the machine to perform the steps of:
    identifying a contemporary trace footprint experienced by a coupled server cluster;

identifying a cache allocation for said coupled server cluster;

retrieving at least two sets of hit rate metrics, each set of metrics corresponding to a particular routing policy;

comparing said hit rate metrics based upon said identified trace footprint and said identified cache allocation to determine a preferred routing policy; and, selecting said preferred routing policy for use in routing content requests to said server cluster.

6. The machine readable storage of claim 5, further comprising the steps of:

computing with said hit rate metrics, an optimal server cluster configuration for said preferred routing policy; and, provisioning an optimal number of servers in said server cluster based upon said computed optimal server cluster configuration.

7. The machine readable storage of claim 5, wherein said selecting step comprises the step of selecting a server load balancing type routing policy when said identified cache allocation approaches in value said identified trace footprint.

8. The machine readable storage of claim 5, wherein said selecting step comprises the step of selecting a content localizing type routing policy when either said identified cache allocation is small, or when said trace footprint is large.

* * * * *